May 6, 1924.
A. T. STURT
MOTOR SUSPENSION
Filed Dec. 17, 1919
1,493,441
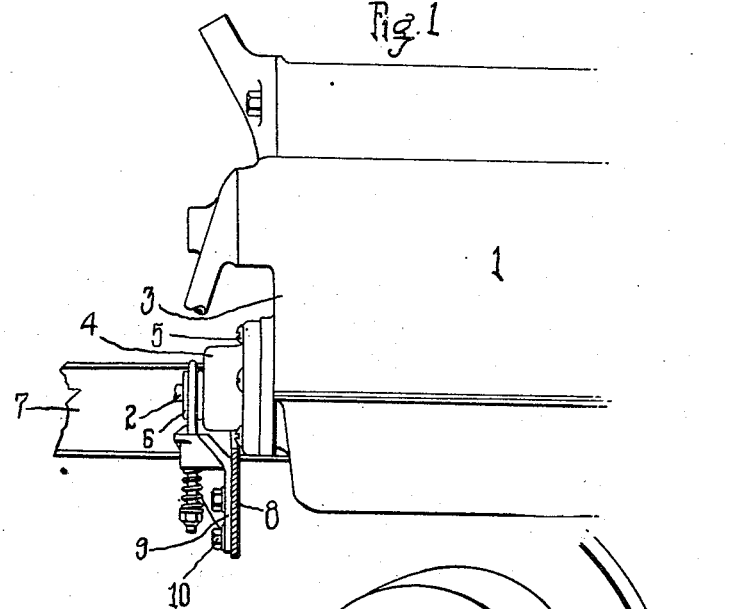
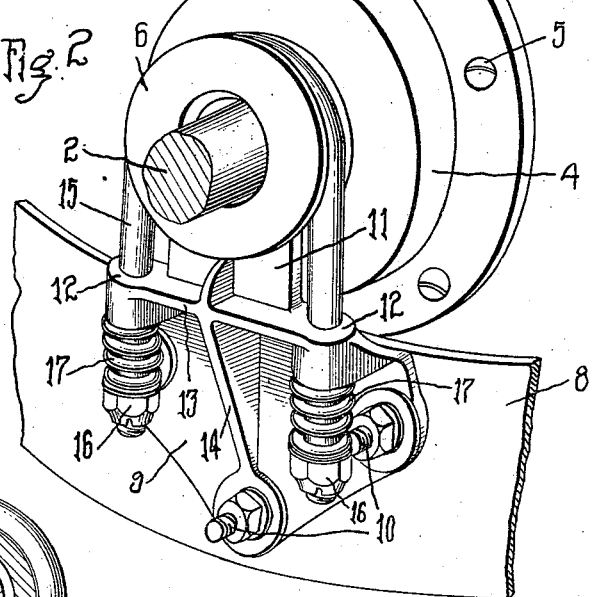
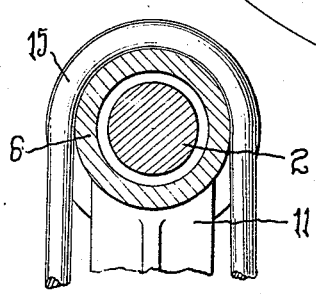
Inventor
Alfred T. Sturt
By his Attorneys
Blackmore, Skinner & Flint.

Patented May 6, 1924.

1,493,441

UNITED STATES PATENT OFFICE.

ALFRED T. STURT, OF NEW YORK, N. Y., ASSIGNOR TO GENERAL MOTORS CORPORATION, OF DETROIT, MICHIGAN, A CORPORATION OF DELAWARE.

MOTOR SUSPENSION.

Application filed December 17, 1919. Serial No. 345,564.

*To all whom it may concern:*

Be it known that I, ALFRED T. STURT, a citizen of the United States, and a resident of New York, county of New York, and State of New York, have invented certain new and useful Improvements in Motor Suspensions, of which the following is a full, clear, concise, and exact description, such as will enable others skilled in the art to which the invention relates to make and use the same, reference being made therein to the accompanying drawings, which form a part of this specification.

The invention relates to means for supporting a body in a frame, and more particularly to means for suspending the front end of an internal combustion engine from the chassis of a motor vehicle.

In the mounting of motors by what is termed three-point suspension it is customary to secure the rear end of the motor to the vehicle frame on each side and to provide a single point of support for the front end of the motor. It is the object of my invention to improve the construction of this third support, and with this object in view the invention comprises various details of construction of such supporting means, as hereinafter set forth.

In the accompanying drawing forming a part of this specification and showing one embodiment of my invention:

Fig. 1 shows in elevation parts of an internal combustion engine the front end of the engine being illustrated in cooperation with my improved support.

Fig. 2 is a perspective showing the support on a larger scale, and

Fig. 3 is a detail sectional view showing parts of the support in assembled relationship.

In the drawings, 1 indicates an internal combustion engine of a type commonly employed as a source of power for motor vehicles. The engine crank shaft 2 is shown as extending forwardly from the engine casing 3, in the usual manner. The engine casing includes a forwardly projecting portion 4, which may be made separately from the main engine casing and secured thereto, as by bolts 5. On the projecting portion 4 is a ring 6, grooved on its circumference and positioned around the crank shaft and approximately concentric therewith. This ring may, of course, be formed integrally with the casing or may be mounted on the casing in any desired way.

The main frame or chassis comprises the usual side members 7 and a cross-bar 8, the latter being shown as having its central portion curved downwardly. On the cross-bar 8 midway of its length is mounted a bracket 9, secured to the cross-bar by suitable means, as bolts 10. This bracket is provided with an upstanding flange 11, concave on its upper edge, as shown in Fig. 3, and with apertured ears 12, also with suitably designed strengthening flanges 13, 14. The concavity of the flange 11 is so shaped as to fit the groove in ring 6, and when the parts are in assembled position the engine is supported by the engagement of the ring with the flange. The parts are further secured by U-bolt 15 which is adapted to seat in the upper portion of the groove of ring 6 and have its ends extending through the apertures of ears 12. On the ends of the U-bolt are nuts 16, and between the nuts and the ears 12 are resilient devices, coiled springs 17 being shown as a preferred form of such devices.

It will be seen that the mounting described provides for a certain amount of universal movement, relative rotative movement being accommodated by the curved seat in flange 11, while a slight amount of movement in other planes is permitted, at the same time being resiliently restrained, by the securing means illustrated. The mounting therefore affords a particularly efficient means of securely retaining the engine upon the frame without permitting the injurious transmission of twisting strains.

It will be understood that various modifications may be made in details without departing from the spirit and scope of the invention and I therefore do not wish to be limited to the precise construction illustrated. It will also be understood that the invention may be advantageously applied in relationships other than that shown, and I therefore desire to cover the invention, whether used for supporting internal combustion engines or for connecting and retaining any other parts where the structure I have devised would be of utility.

I claim:

1. In a device of the class described, the combination of a supporting bracket having a projecting flange with a concave seat therein, a member to be supported having a projecting portion with a groove therein, said flange being seated in said groove, a retaining device also seated in said groove and engaging said bracket, and resilient securing means arranged to force said retaining device and said flange toward each other and into said groove.

2. In a motor support for motor vehicles, the combination of an engine casing having a crank shaft therein, a supporting device having a groove therein concentric with said shaft, supporting means having a concave seat engaging said groove, retaining means engaging said groove on the side opposite said seat, and spring means operative to force said supporting means and retaining means toward each other whereby free oscillation is permitted between the casing and its support about the axis of said shaft but lateral or twisting movements are resiliently restrained.

3. In a device of the class described the combination of a motor casing, an annular member thereon provided with a circumferential groove, a frame, an apertured bracket on said frame, said bracket having an upstanding flange with a curved seat to engage in said groove, a U-shaped member also engaging in said groove and passing through the apertures in said bracket, and resilient means co-operative with said U-shaped member to retain the annular member in engagement with the bracket.

4. In a device of the class described the combination of a motor casing, a motor shaft extending through the wall of said casing, an annular grooved member on said casing approximately concentric with said shaft, a vehicle frame comprising a cross-bar, a bracket on said cross-bar provided with apertured ears and with an upstanding flange to co-operate with said grooved member, a U-bolt engaging said grooved member and passing through said apertured ears, and resilient means co-operating with said U-bolt to retain said member on said bracket.

In testimony whereof I affix my signature.

ALFRED T. STURT.